United States Patent [19]
Woodle

[11] 3,767,563
[45] Oct. 23, 1973

[54] ADSORPTION-DESORPTION PROCESS FOR REMOVING AN UNWANTED COMPONENT FROM A REACTION CHARGE MIXTURE

[75] Inventor: Robert A. Woodle, Nederland, Tex.

[73] Assignee: Texaco Inc., New York, N.Y.

[22] Filed: Dec. 23, 1971

[21] Appl. No.: 211,442

[52] U.S. Cl.................... 208/85, 208/91, 23/260
[51] Int. Cl........................................ C10g 1/00
[58] Field of Search.................. 208/85, 91, 310

[56] References Cited
UNITED STATES PATENTS

| | | | |
|---|---|---|---|
| 3,063,934 | 11/1962 | Epperly et al. | 208/91 |
| 2,632,727 | 3/1953 | Lanneau et al. | 208/310 |
| 2,415,315 | 2/1947 | Walter et al. | 208/85 |
| 2,904,507 | 9/1959 | Jahnig | 208/310 |
| 2,996,558 | 8/1961 | Feldbauer | 208/310 |
| 3,063,933 | 11/1962 | Meiners | 208/91 |
| 3,265,755 | 8/1966 | Evans et al. | 208/310 |
| 3,288,705 | 11/1966 | Humphries | 208/310 |

Primary Examiner—Delbert E. Gantz
Assistant Examiner—James W. Hellwege
Attorney—Thomas H. Whaley et al.

[57] ABSTRACT

A process for converting a reactant hydrocarbon wherein a process charge stream contains such reactant in admixture with a component which interferes with the conversion reaction. The process comprises adsorbing the interfering component from the process charge mixture at a relatively low temperature; reacting the reactant hydrocarbon at suitable reaction conditions; and subsequently desorbing the interfering component into the reaction effluent at an elevated temperature. Solid adsorbents selective for the interfering component are employed in this process and no extraneous streams are employed to aid in desorbing such interfering component from the selective adsorbent.

10 Claims, 1 Drawing Figure

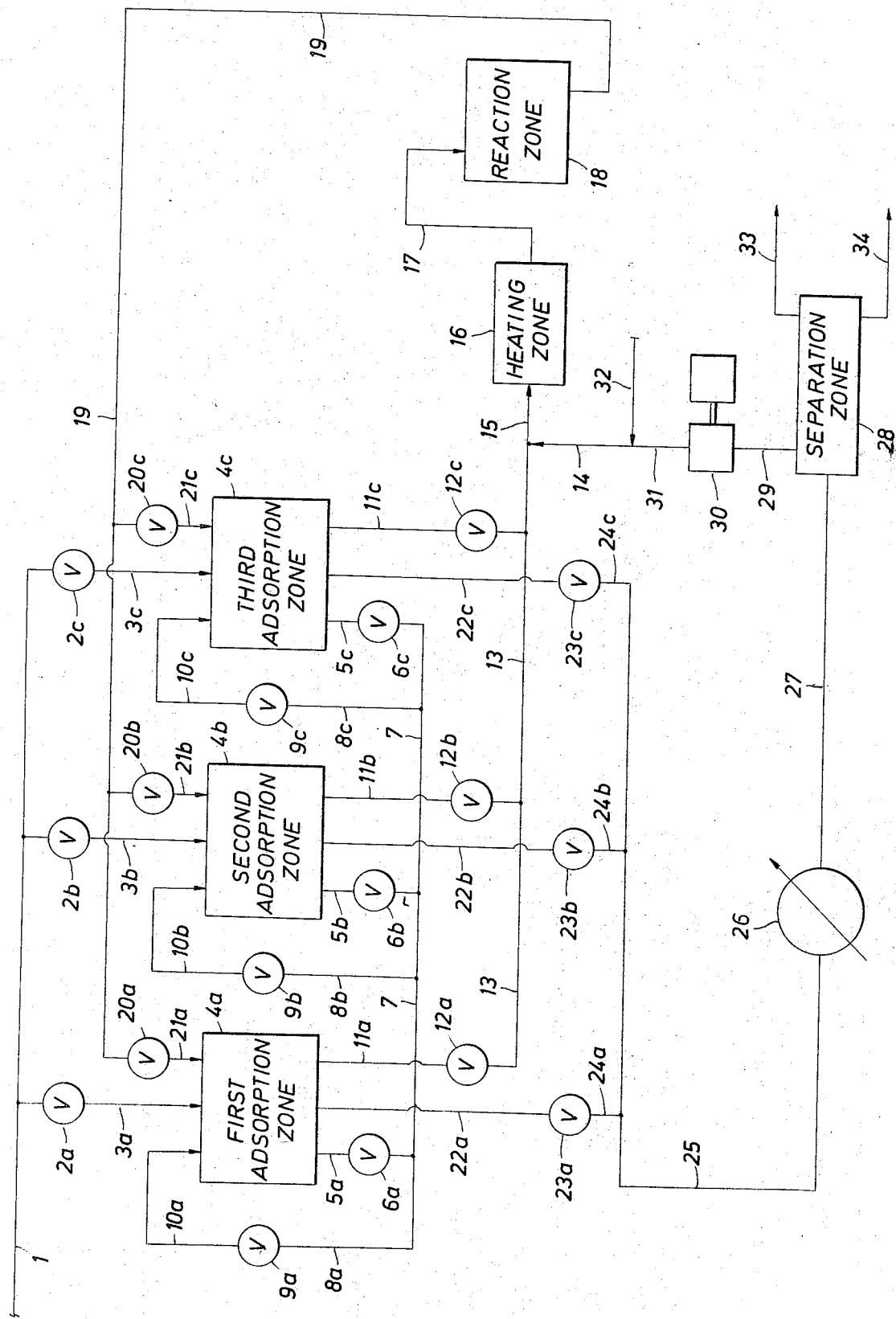

3,767,563

ADSORPTION-DESORPTION PROCESS FOR REMOVING AN UNWANTED COMPONENT FROM A REACTION CHARGE MIXTURE

BACKGROUND OF THE INVENTION

1. Field of the Invention

The subjeect of the present disclosure concerns an improved method for converting hydrocarbons and a process system for implementing such improved conversion method. More particularly, a method and system are presented for adsorbing from a process charge stream a component which interferes with conversion of a reactant hydrocarbon and subsequently desorbing such interfering component into a conversion reaction effluent stream such that the interfering component is recovered in admixture with the conversion reaction product. The process system disclosed herein comprises three adsorption zones and a reaction zone in such relationship that process charge passes through a first adsorption zone, a second adsorption zone, the reaction zone, and a third adsorption zone. By following this flow sequence, the interfering component may be adsorbed from the process charge in the first adsorption zone, the reactant component of the process charge may then be reacted in the reaction zone in the absence of such interfering component, and subsequently the interfering component may be desorbed into the reaction zone effluent to recover the interfering component in admixture with the reaction product. In the process of this invention, it is contemplated that the adsorption step will be performed at a temperature lower than the desorption step and that the adsorption step and desorption step of the process will by cyclic. The cycle employed comprises an adsorption cycle, a desorption cycle, and a cooling cycle. In such a cyclic process, each of the adsorption zones is employed sequentially in the order adsorption cycle, desorption cycle and cooling cycle. One of the adsorption zones is always occupied in one cycle of the adsorption process.

2. Discussion of the Prior Art

In many hydrocarbon conversion processes a reactant hydrocarbon which is to be converted into a desired product is found in admixture with a component which interferes with the desired conversion reaction but which interfering component is acceptable as a component of the product recovered from such process. One example of such a process is catalytic wax cracking of waxy paraffin hydrocarbons having a carbon number of about $C_{18}$ and higher which are present in a lubricating oil fraction. Such wax cracking is performed to lower the pour point temperature of such lubricating oil fraction to an acceptable level. Commonly, some aromatic hydrocarbons are present in the lubricating oil fraction even though such lubricating oil fraction is solvent refined prior to the wax cracking step. The presence of aromatic hydrocarbons in the catalytic cracking of waxy paraffin hydrocarbons interferes with such catalytic cracking reaction to the extent that higher temperatures are required in the reaction zone in order to obtain the desired low pour point temperature for the lubricating oil fraction. The presence of aromatic hydrocarbons is generally acceptable in finished lubricating oils, provided the lubricating oils have an acceptable viscosity index number. Another example of such a process is catalytic reforming of gasoline stocks to increase the octane number. The aromatic hydrocarbons in such gasoline stocks are substantially unaffected by the reforming reaction and the presence of aromatics in the reforming reaction charge stocks serve to take up reactor capacity. Such aromatic hydrocarbons have a high octane number and are desired components of the reformed gasoline product. In the prior art the presence of such interfering components in the process charge stock is often compensated for by utilizing increased reaction severities. Also, it is known to separate such interfering components from the process charge stock by physical separation means such as distillation, extraction, adsorption, etc.

In separation systems employed in the prior art, the interfering component is recovered separately and in relatively high purity from other streams in the process. Such separate recovery of the interfering component requires separate facilities for handling the component until it can be recombined with a product stream from the process or otherwise disposed of. Particularly, in adsorption systems employed in the prior art, wherein the process charge stream is treated with an adsorbent to remove the interfering component therefrom and subsequently the interfering component is desorbed, it is common practice to employ an eluting material to aid in such desorption. Subsequent to the desorption step the interfering component must be separated from the eluting material and such eluting material is generally recovered for recycle to a subsequent desorption step.

SUMMARY OF THE INVENTION

According to the present invention, a system is disclosed which comprises three adsorption zones and a reaction zone in such configuration that an interfering component present in a process charge stock comprising a reactant hydrocarbon may be adsorbed therefrom; the reactant hydrocarbon may be converted to the desired product in the reaction zone; and subsequently the interfering component may be desorbed from the adsorption zone employing the reaction zone effluent stream. The process of the present invention comprises treating a process charge stock containing a reactant hydrocarbon and an interfering component in a first adsorption zone to adsorb such interfering component at a relatively low temperature; cooling a second adsorption zone from a relatively high desorption temperature, as will hereinafter be described, to about the adsorption zone temperature employing effluent from the first adsorption zone; treating the effluent from the second adsorption zone in a reaction zone to convert reactant hydrocarbon into a desired product; and desorbing interfering component from the third adsorption zone employing effluent from the reaction zone at an elevated temperature which is higher than the temperature employed in the adsorption step. In order to maintain a continuous flow of reactant hydrocarbon to the reaction zone, a cyclic process comprising an adsorption cycle, a desorption cycle, and a cooling cycle is instituted for each of the three adsorption zones employed in the present process. Accordingly, a first adsorption zone is placed in the adsorption cycle for a time period to adsorb interfering component from the process charge stream. During this time period a second adsorption zone is being desorbed of interfering components which was previously adsorbed thereon. Within the contemplation of this invention, the desorption cycle must be substantially complete within the period of the adsorption cycle. Within the adsorption cycle time period, the third adsorption zone, previously in the desorption cycle and at a temperature above the temperature employed in the adsorption cycle, is subjected to a cooling cycle wherein effluent from the adsorption cycle is passed through the adsorption zone being cooled to reduce its temperature from about the temperature employed during the desorption cycle. Each of the three adsorption zones employed in the system of the present invention are sequentially employed in an adsorption cycle and a desorption cycle, a cooling cycle, and are returned to the adsorption cycle.

One advantage of employing the system and method of the present invention is that by adsorbing an interfering component from the process charge stream, the concentration of the preferred reactant in the reaction zone is increased. Also, by by-passing the reaction zone with a component which adversely affects the conversion of the desired reactant or which shifts the thermodynamic equilibrium of the conversion reaction, the efficiency of converting the reactant into desired product may be substantially increased. Additionally, it may be possible to reduce the reaction severity in the reaction zone with the interfering component removed to obtain the same rate of conversion of a reactant into desired product. In the case where a catalyst is employed in the reaction zone the reduced conversion reaction severity may result in extended life for the catalyst before it must be regenerated or replaced. By employing the process of the present invention, adsorption and subsequent desorption of an interfering component is effected by employing process streams only. No extraneous streams, such as an eluting stream to aid in desorption of the interfering components, are required when the process of the invention is followed. These and other advantages of the present invention are more completely described in the detailed description of the invention which follows.

BRIEF DESCRIPTION OF THE DRAWING

The attached FIGURE is a schematic representation of a process system embodying the apparatus configuration of the present invention and which may be utilized to practice the method of the present invention.

DETAILED DESCRIPTION OF THE INVENTION

Charge stocks which are within the contemplation of the present invention include those hydrocarbon charge stocks which contain a desired reactant and an interfering component. The interfering component, to be separated according to the method of the present invention, must be adsorbable into a selected adsorbent to the substantial exclusion of the reactant at a relatively low temperature and must be desorbable from the selected adsorbent at an elevated temperature above the temperature employed in the adsorption cycle. An example of a charge stock within the contemplation of the present invention comprises catalytic reformer charge stock containing aromatic hydrocarbons as well as naphthenic and paraffinic hydrocarbons. The ring structure of aromatic hydrocarbons is substantially unaffected in a catalytic reforming reaction and substantially the only reaction which aromatic hydrocarbons undergo is cracking of alphatic side chains therefrom. The cracking of alphatic side chains from aromatic hydrocarbons in a catalytic reforming reaction has the result of converting a high molecular weight aromatic hydrocarbon with a relatively high octane rating into a lower molecular weight aromatic hydrocarbon and gas, which decreases the yield of high octane gasoline from the reforming reaction. Additionally, aromatic hydrocarbons in the reforming charge stock dilute the naphthenic and paraffinic reactants, thereby requiring higher reaction severities in order to obtain the desired conversion of reactants into high octane products. The aromatic components of a catalytic reformer charge stock may be separated from the nonaromatic components by adsorption onto a selective adsorbent such as, for example, silica gel.

Another example of a charge stock which may be employed in the present invention is a lubricating oil fraction which comprises wax paraffin hydrocarbons and aromatic hydrocarbons. Even though a lubricating oil fraction has been treated to increase the viscosity index number by removing aromatic hydrocarbons therefrom in a process such as solvent extraction, such a treated lubricating oil fraction still commonly contains an appreciable amount of aromatic hydrocarbon. In a catalytic wax cracing operation wherein the wax paraffin containing lubricating oil fraction is treated over a catalyst to convert the wax paraffin hydrocarbons into lower molecular weight species and thereby lowering the pour point temperature of the lubricating oil fraction, the presence of aromatic hydrocarbon adversely effects the catalytic reaction such that increased reaction severities must be employed in order to obtain the desired conversion of wax paraffin hydrocarbons. The presence of the aromatic hydrocarbon in the lubricating oil fraction is acceptable and increases the overall yield of the desired lubricating oil. Therefore, by following the process of the present invention, the aromatic component of the lubricating oil may be adsorbed from the lubricating oil fraction and the wax paraffin component converted under less severe reaction conditions with the subsequent desorption of the aromatic component into the conversion reaction effluent stream to yield a treated lubricating oil having the desired viscosity index number and a low pour point temperature.

Processes to which the present invention are applicable include those which incorporate a conversion step wherein a desired reactant is converted into a desired product and which conversion step may be adversely affected by the presence of an interfering component commonly found in admixture with the desired reactant in charge stocks supplied to such a process. The conversion step of such processes may comprise a catalytic or noncatalytic reaction. A conversion of reactant into desired product may comprise action upon the reactant alone such as for example dehydrogenation of naphthenic hydrocarbons and isomerization of paraffinic hydrocarbons or the conversion may involve a reaction between the reactant and another component such as, for example, cracking of wax paraffin hydrocarbons in the presence of hydrogen to yield lower molecular weight paraffinic hydrocarbons.

The interfering components which are to be separated from the reactant are those which adversely affect the conversion reaction in some manner, but which are acceptable as components of the product obtained from the process. The adverse effect of the interfering component may be to dilute the reactant concentration in the process charge, thereby requiring increased conversion reaction severity in order to obtain the desired conversion of reactant. Such interfering component may also be one which upsets the conversion reaction thermodynamic equilibrium thereby reducing the overall conversion of reactant into desired product. Additionally, the interfering component may have the adverse effect of undergoing an undesirable side reaction or may interfere with the activity of a catalyst to promote the desired conversion of reactant.

Adsorbent materials which may be used within the contemplation of the present invention include those solid adsorbents which are selective for the adsorption of an interfering component to the substantial exclusion of a reactant component under suitable conditions of temperature and pressure. Additionally, such adsorbent materials must allow desorption of adsorbed interfering components under conditions of increased temperature and/or reduced pressure in the presence of effluent from the conversion reaction employed in the process. Examples of solid adsorbents which may be employed in the present invention include silica gel, activated carbon, activated clays, synthetic zeolitic molecular sieves, etc.

The process of the present invention comprises a cyclic method for separating interfering components from a process charge stream and subsequently desorbing said interfering components into a conversion reaction effluent stream, and a continuous conversion reaction wherein reactant contained in the process charge is converted into a desired product. The cyclic portion of the process comprises an adsorption cycle, a desorption cycle, and a cooling cycle. In the adsorption cycle, a process charge stream is contacted with a selective adsorbent at a relatively low temperature which will allow the interfering component to be adsorbed into the selective adsorbent. Such temperature may be selected to suit the requirements of the particular process being performed. The process charge stock charged to the adsorption cycle may be in the vapor phase, the liquid phase, or mixed phase so long as it is in a condition which allows the adsorption of the interfering material therefrom. An adsorption zone is maintained on the adsorption cycle for a period of time such that a substantial portion of the adsorptive capacity of the selective adsorbent is utilized to adsorb the interfering component from the process charge stream. The adsorption cycle time period is not substantially longer than the time required to utilize the adsorptive capacity of the adsorptive present in the adsorption zone. Such adsorption cycle time period may be continued until the interfering component breaks through and is present in the effluent from the adsorption zone, or the adsorption cycle may be continued for a set time period which is determined to be within the adsorptive capacity limits of the selective adsorbent employed in the adsorption zone.

At the end of an adsorption cycle, a selective adsorbent containing an adsorbed interfering component is switched to the desorption cycle. In the desorption cycle, effluent from the conversion reaction is employed to desorb the interfering component from the selective adsorbent. Temperatures employed in the desorption cycle exceed those employed in the adsorption cycle by an amount sufficient to allow desorption of the interfering component from the selective adsorbent into the conversion reaction effluent stream. Such desorption cycle temperatures may be selected to obtain the desired rate of desorption. The condition of the conversion reaction effluent stream may be vapor phase, liquid phase, or mixed phase which is effective to desorb interfering component from the selective adsorbent. The desorption cycle continues for a time period equal to the time period employed in the adsorption cycle. Therefore it is necessary that desorption of interfering cmponent be substantially complete within such time period. Conditions within the desorption zone during the desorption cycle may be selected to achieve the desired desorption of interfering component within the required time period. For example, the temperature and pressure within the desorption zone and the conditions of the conversion reaction effluent stream may be adjusted to give the required desorption within the set time.

A selective adsorbent at the end of the desorption cycle is switched to the cooling cycle. The selective adsorbent, when switched from the desorption cycle to the cooling cycle, is depleted in adsorbed interfering component and is at a temperature about equal to the temperature employed in the desorption cycle. Before such selective adsorbent may again be used in an adsorption cycle, it is necessary that it be cooled to about the temperature employed in such adsorption cycle. Therefore, within the contemplation of this invention, effluent from an adsorption cycle is passed through the selective adsorbent being cooled to remove heat therefrom.

The desorption cycle and cooling cycle are continued for a time period equal to the adsorption cycle time period and flow of effluent from the adsorption cycle is continued through the selective adsorbent being cooled in the cooling cycle. By this means the temperature of the selective adsorbent being cooled is reduced from about the desorption cycle temperature to about the adsorption cycle temperature. Therefore, at the end of the cooling cycle the cooled selective adsorbent, depleted in adsorbed interfering component, is in a condition suitable for use in a subsequent adsorption cycle.

The adsorption, desorption, and cooling cycles of the process of the present invention are cyclic and the conversion reaction is continuous. Therefore, to maintain the flow of reactant to the reaction zone, flow of process charge stock to selective adsorbent on an adsorption cycle must be maintained. To maintain the flow of reactant to the reaction zone, three adsorption zones each containing selective adsorbent are employed such that one adsorption zone is always on an adsorption cycle. During the period that one adsorption zone is on an adsorption cycle, another is on a desorption cycle and the third adsorption zone is on a cooling cycle. At the end of an adsorption cycle, the adsorption zone thereon is switched to a desorption cycle, the adsorption zone on a desorption cycle is switched to a cooling cycle and the adsorption zone on a cooling cycle is returned to an adsorption cycle.

In order to better explain the present invention, reference is now made to the attached drawing. Such drawing shows one embodiment of the present invention and is not intended to limit the present invention in any way. The attached drawing is a schematic representation of a catalytic wax cracking treatment of a lubricating oil fraction to lower the pour point thereof which embodies the present invention. For the sake of clarity many elements commonly employed in the operation of a process unit, but which are unnecessary for a description of the invention herein, have been omitted. Such elements as pumps, valves, instrumentation, etc. commonly used in the operation of a process unit may be readily supplied by one skilled in the art. For convenience in describing the process flow with reference to the drawing, only those valves which are open will be described. The other valves, which are not described as being opened, are to be considered closed.

Referring now to the drawing, a lubricating oil fraction process charge stream, comprising wax paraffin hydrocarbons and about 12.5 volume percent aromatic hydrocarbon, is charged to a catalytic wax cracking process via line 1. From line 1 the process charge passes via valve 2a through line 3a into the first adsorption zone 4a which is upon an adsorption cycle. In the first adsorption zone 4a, the process charge is contacted with a silica gel adsorbent at a temperature of about 150° – 200°F., in the liquid phase, to adsorb aromatic hydrocarbons from the process charge stream.

From the first adsorber 4a the adsorption cycle effluent stream comprising wax paraffin hydrocarbons passes via line 5a through valve 6a into line 7. From line 7, adsorption cycle effluent passes via line 8b through valve 9b and line 10b into the second adsorber 4b which is upon a cooling cycle. In the cooling cycle the adsorption cycle effluent contacts silica gel adsorbent to cool such adsorbent from a desorption cycle temperature of about 550°–650°F. to about the adsorption cycle temperature of 150°–200°F.

Effluent from the cooling cycle passes via line 11b through valve 12b into line 13. Recycle hydrogen from line 14 mixes with cooling cycle effluent from line 13 in line 15 and such mixture passes into a heating zone 16. In heating zone 16 the cooling cycle effluent-hydrogen mixture is heated to a temperature of about 550°–650°F. and passes therefrom via line 17 into a reactor 18. In reactor 18 the heated mixture is contacted with a was cracking catalyst comprising about 2 percent palladium supported upon a treated synthetic mordenite base at a temperature of from about 550°–650°F., a pressure of about 850 psig, and a hydrogen to hydrocarbon ratio of about 8,000 cubic feet of hydrogen per barrel of hydrocarbon. In reaction zone 18 wax paraffins are cracked into lower molecular weight paraffins, thereby reducing the pour point temperature of the resulting treated lubricating oil product.

From reactor 18, reactor effluent passes via line 19 through valve 20c and line 21c into a third adsorber 4c which is upon a desorption cycle. In the third adsorber 4c, the reactor effluent at a temperature of about 550°–650°F. contacts silica gel adsorbent containing adsorbed aromatic hydrocarbon to desorb such aromatic hydrocarbons therefrom. Desorption cycle effluent passes via line 22c through valve 23c and line 24c into line 25. From line 25 the third adsorber effluent passes into cooling zone 26 to cool said desorption cycle effluent to a temperature of about 150°F. From the cooling zone 26, effluent passes via line 27 into vapor-lqiuid separation zone 28. In the vapor-liquid separation zone 28 a fraction comprising hydrogen and low molecular weight hydrocarbons is recovered via line 29 and passes to recycle compressor 30. From recycle compressor 30 recycle gas passes into line 31. Make-up hydrogen is added to the recycle gas via line 32 to form a recycle hydrogen stream. The recycle hydrogen stream passes via line 14 into line 15 wherein it mixes with additional adsorption cycle effluent, as hereinabove described.

A vent gas stream, comprising hydrogen and low molecular weight hydrocarbons, is vented from vapor-lqiuid separation zone 28 via line 33. Such gas is vented in an amount sufficient to maintain the concentration of low molecular weight hydrocarbons in the recycle hydrogen stream at a selected low concentration.

From the vapor-liquid separation zone 28, a liquid stream comprising treated lubricating oil product, having a substantially lower pour point temperature than the lubricating oil fraction charged to the process via line 1, is recovered via line 34.

In the process as hereinabove described, an adsorption cycle may be continued for a set time period. At the end of an adsorption cycle, the adsorption zone thereon is switched to a desorption cycle, the adsorption zone upon a desorption cycle is switched to a cooling cycle, and the adsorption zone upon a cooling cycle is returned to an adsorption cycle. Such adsorption cycles are switched by opening and closing appropriate valves in the inlet manifold to each adsorption zone and in the outlet manifold from each adsorption zone.

EXAMPLE I

In this example a waxy lube oil fraction which has been solvent refined to remove a portion of the aromatic hydrocarbons therefrom and thereby increase such waxy lube oil fraction viscosity index number to a selected value is treated to lower the pour point temperature thereof. The pour point temperature is lowered by catalytically cracking wax paraffin hydrocarbons into lower boiling hydrocarbons in the presence of molecular hydrogen and a cracking catalyst comprising about 2 wt. percent palladium supported upon an acid treated synthetic mordenite base. In this example a solvent refined lubricating oil fraction having a pour point temperature of about 105°F., a viscosity index number of about 104, and comprising waxy paraffins and about 12.5 volume percent aromatic hydrocarbons was employed as process charge.

In a first run which is a base run employing the method of the prior art, containing the aromatic hydrocarbons was treated with a catalyst comprising about 2 percent palladium supported on an acid treated synthetic mordenite base at a pressure of about 850 psig, a liquid hourly space velocity of about 0.5 volumes of oil per hour per volume of catalyst, a hydrogen to hydrocarbon ratio of about 8,000 standard cubic feet of hydrogen per barrel of oil, and a temperature of about 650°F. The pour point temperature of the waxy lube oil fraction was reduced by this treatment from about 105°F. to about +30°F.

In a second run, the waxy lube oil fraction containing wax paraffins and about 12.5 volume percent aromatics as described above was treated according to the method of the present invention in a system similar to that shown in the attached drawing and described hereinabove. The waxy lube oil fraction has a pour point temperature of about 105°F. and a viscosity index number of 104. In this example, three adsorption columns were used being designated respectively as A, B, and C. Each column was loaded with a silica gel bed sized for a 15-minute capacity based upon the flow rate of about 1,000 cc per hour of the waxy lube oil fraction. A reactor containing a catalyst comprising about 2 percent palladium supported upon an acid treated synthetic mordenite base for conversion of wax paraffins into lower boiling hydrocarbons was employed in the process.

Operating conditions in the reactor included a pressure of about 850 psig, a liquid hourly space velocity of about 0.5 volumes of oil per hour per volume of catalyst, a hydrogen to hydrocarbon ratio of about 8,000 standard cubic feet of hydrogen per barrel of hydrocarbon and a temperature of about 580°F.

The waxy lube oil fraction entered bed A, on the adsorption cycle, at a temperature of about 150°-200°F. for adsorption of aromatic hydrocarbons into the bed of silica gel contained therein. Adsorption cycle effluent at a temperature of about 150-200°F. was passed through adsorber B, upon a cooling cycle, to reduce the temperature of the silica gel bed contained therein from about 550°F. to about 200°F. Effluent from a cooling cycle was combined with recycle hydrogen in a ratio of hydrogen to hydrocarbon of about 8,000 standard cubic feet of hydrogen per barrel of hydrocarbon and the mixture was heated in a heating zone to a temperature of about 580°F. From the heating zone the mixture of hydrogen and hydrocarbon was passed into the reaction zone wherein the waxy paraffins were converted, in the presence of the palladium catalyst, into lower boiling paraffin hydrocarbons.

From the reaction zone, the reactor effluent passed at a temperature of about 550°F. into adsorber C wherein the hot reaction zone effluent contacted a silica gel bed containing adsorbed aromatic hydrocarbons. The hot reaction zone effluent desorbed the aromatic hydrocarbons from the silica gel bed in the desorption cycle. Effluent from a desorption cycle was cooled to a temperature of about 150°F. and transferred to a vapor-liquid separation zone maintained at a pressure of about 800 psig. Liquid from the vapor-liquid separation zone comprised a treated lube oil fraction having a viscosity index of about 60 and a pour point temperature of about −30°F.

Thus, it can be seen by comparing the results obtained in Example 1 and in Example 2, that by utilizing the process of the present invention a waxy lube oil fraction may be treated to reduce the pour point temperature thereof. By employing the method of the present invention, a reaction temperature about 70°F. lower than a reaction temperature employed in the prior art is effective to reduce the pour point temperature about 60°F. below the pour point temperature obtainable with prior art wax cracking methods. Lower temperatures can be employed and the pour point temperature will not exceed pour point temperatures obtainable from the prior art method.

The adsorption zones within the contemplation of the present invention are of similar configuration such that they may be switched sequentially from the adsorption cycle to the desorption cycle to the cooling cycle. Each adsorption zone may comprise one or more vessels containing one or more beds of solid adsorbent. Such adsorbent beds within each adsorption zone may be in series or parallel alignment. Flow of process streams through such adsorption zone may be up flow or down flow as is convenient or required to meet process requirements.

Many variations and modifications may be made in the process and to the system of the invention as disclosed herein without departing from the spirit and scope of such invention. All such variations and modifications are intended to be included which are within the spirit and scope of the appended claims.

I claim:

1. In a process for conversion of a reactant hydrocarbon wherein a process charge stream containing such reactant hydrocarbon contains a component which interferes with catalytic conversion of reactant into a desired reaction product, wherein such interfering component may be adsorbed upon a selective adsorbent at a lower temperature, and wherein said interfering component may be desorbed from said selective adsorbent at a higher temperature the improvement which comprises:

a. adsorbing, in an adsorption step, interfering component from said process charge stream into a first selective adsorbent bed;
   b. flowing, in a cooling step adsorption step effluent through a second desorbed selective adsorbent bed for cooling said desorbed bed from about a desorption step temperature to about the adsorption step temperature;
   c. converting reactant hydrocarbon contained in the cooling step effluent into desired product in a catalytic conversion zone;
   d. adjusting catalytic conversion zone effluent to a temperature sufficient to desorb interfering component from a selective adsorbent;
   e. flowing temperature adjusted conversion zone effluent of step (d) through a third selective adsorbent bed containing adsorbed interfering component, in a desorption step, for desorption of interfering component therefrom; and
   f. recovering desorption step effluent as a product stream comprising desired reaction product and to an adsorption cycle, wherein switching of each adsorption zone from 2. A process according to claim 1 wherein three adsorption zones containing selective adsorbent are employed, wherein each adsorption zone is sequentially employed in an adsorption cycle, a desorption cycle, a cooling cycle, and returned to an adsorption cycle, wherein switching of each adsorption zone from one cycle to the next cycle in sequence occurs simultaneously, and wherein adsorption cycle effluent is continuously supplied to the reaction zone.

3. The process of claim 2 wherein the duration of each cycle is for a selected time period.

4. The process of claim 2 wherein the duration of each cycle is determined by the adsorptive capacity of selective adsorbent being employed in an adsorption cycle.

5. The process of claim 2 wherein the conversion reaction is a catalytic cracking of wax paraffins into lower molecular weight paraffin hydrocarbons, and wherein the process charge is a lubricating oil fraction comprising wax paraffin hydrocarbons and aromatic hydrocarbons.

6. The process of claim 5 wherein the selective adsorbent comprises silica gel, and wherein the interfering component adsorbed comprises aromatic hydrocarbons.

7. The process of claim 2 wherein the process charge comprises aromatic and naphthenic hydrocarbons in the gaoline boiling range, and wherein the conversion reaction is catalytic reforming of naphthenic hydrocarbons into aromatic hydrocarbons.

8. The process of claim 7 wherein the selective adsorbent comprises silica gel, and wherein the interfering component adsorbed comprises aromatic hydrocarbons.

9. A system for converting a reactant into a desired product wherein a process charge stream containing said reactant also contains a component which interferes with the conversion of said reactant, wherein said interfering component is adsorbed from said process charge stream into a selective adsorbent at a relatively low temperature in an adsorption cycle, and wherein said interfering component is desorbed from said selective adsorbent at a relatively high temperature in a desorption cycle; which system comprises:

A. A first adsorption zone containing selective adsorbent and having an inlet and an outlet means;

B. A second adsorption zone containing selective adsorbent and having an inlet and an outlet means;

C. A third adsorption zone containing selective adsorbent and having an inlet and an outlet means;

D. A first valved manifold means for selectively passing process charge to the inlet of any one of the three adsorption zones for adsorption, in an adsorption cycle, of the interfering component from the process charge stream.

E. A second valved manifold means for selectively passing adsorption cycle effluent from any one of the three adsorption zones into the inlet of the remaining adsorption zones for cooling, in a cooling cycle, selective adsorbent from about a desorption cycle temperature to about an adsorption cycle temperature; F. A heating zone for heating effluent from a cooling cycle, containing reactant, to a desired conversion temperature;

G. A third valved manifold means for selectively passing adsorption cycle effluent from any one of the three adsorption zones to the heating zone;

H. A reaction zone for converting reactant contained in the heating zone effluent into desired product;

I. A fourth valved manifold means for selectively passing reaction zone effluent into the inlet of any one of the three adsorption zones, in a desorption cycle, to desorb interfering component from selective adsorbent;

J. A fifth valved manifold means for selectively passing desorption cycle effluent, comprising desired product and interfering component, from any one of the three adsorption zones into a recovery means; and K. A recovery means for recovering a process product comprising desired product and interfering component from a desorption cycle effluent.

10. The system of claim 9 including control means for simultaneously operating the five valved manifold means such that, concurrently, one of the three adsorption zones is upon an adsorption cycle, one of the adsorption zones is upon a desorption cycle and one of the adsorption zones is upon a cooling cycle, and such that each adsorption zone passes sequentially through an adsorption cycle, a desorption cycle, a cooling cycle and is returned to an adsorption cycle.

* * * * *

PC-1050
(5/69)

UNITED STATES PATENT OFFICE
CERTIFICATE OF CORRECTION

Patent No. 3,767,563  Dated October 23, 1973

Inventor(s) ROBERT A. WOODLE

It is certified that error appears in the above-identified patent and that said Letters Patent are hereby corrected as shown below:

Col. 4, line 21: Correct spelling of [cracing] to cracking.

Col. 4, line 46: Correct spelling of [addversely] to adversely.

Col. 6, line 6: Correct spelling of [cmponent] to component.

In Claim 1 at Col. 10, lines 34-37: Correct the printed material.

f. [recovering desorption step effluent as a product stream comprising desired reaction product and to an adsorption cycle, wherein switching of each adsorption zone from]

to properly read as follows:

f) recovering desorption step effluent as a product stream comprising desired reaction product and interfering component.

Signed and sealed this 16th day of July 1974.

(SEAL)
Attest:

McCOY M. GIBSON, JR.
Attesting Officer

C. MARSHALL DANN
Commissioner of Patents